US006267893B1

(12) United States Patent
Luxemburg

(10) Patent No.: US 6,267,893 B1
(45) Date of Patent: Jul. 31, 2001

(54) PROCESS FOR CLEANING FLUIDS AND PARTICULATE SOLIDS

(76) Inventor: S. Roy Luxemburg, 1621 Sherwood Forest, Baton Rouge, LA (US) 70815-5459

( * ) Notice: Subject to any disclaimer, the term of this patent is extended or adjusted under 35 U.S.C. 154(b) by 0 days.

(21) Appl. No.: 09/023,630

(22) Filed: Feb. 13, 1998

Related U.S. Application Data

(60) Provisional application No. 60/038,175, filed on Feb. 13, 1997.

(51) Int. Cl.⁷ .............................. C02F 1/52; E21B 43/00
(52) U.S. Cl. .................... 210/723; 210/734; 210/735; 210/758; 507/226
(58) Field of Search ................... 210/758, 723, 210/735, 734; 507/226

(56) References Cited

U.S. PATENT DOCUMENTS

| | | | |
|---|---|---|---|
| 3,332,904 | * | 7/1967 | La Combe . |
| 3,544,597 | * | 12/1970 | Killam . |
| 3,679,000 | * | 7/1972 | Kaufman . |
| 3,692,673 | * | 9/1972 | Hoke . |
| 3,737,037 | | 6/1973 | Bone, III ................................ 210/73 |
| 4,451,337 | | 5/1984 | Luxemburg ........................ 210/708 |
| 4,455,241 | * | 6/1984 | Swanson . |
| 4,599,117 | * | 7/1986 | Luxemburg ........................ 210/708 |
| 4,655,943 | * | 4/1987 | Elmquist . |
| 4,756,836 | * | 7/1988 | Jeffrey ................................ 210/750 |
| 5,032,296 | * | 7/1991 | Patel . |
| 5,132,025 | * | 7/1992 | Hays .................................... 210/758 |
| 5,134,118 | | 7/1992 | Patel ................................... 507/121 |
| 5,286,386 | * | 2/1994 | Darien . |
| 5,339,903 | * | 8/1994 | Eoff et al. .......................... 166/293 |
| 5,382,371 | * | 1/1995 | Stahl . |
| 5,433,863 | * | 7/1995 | Braden . |
| 5,458,198 | | 10/1995 | Hashemi et al. ..................... 166/312 |
| 5,789,349 | * | 8/1998 | Patel . |
| 5,792,828 | * | 8/1998 | Quinn . |
| 5,922,653 | * | 7/1999 | Ahmed . |
| 6,039,880 | * | 3/2000 | Morataya . |

FOREIGN PATENT DOCUMENTS

| | | | | |
|---|---|---|---|---|
| 0164225 | 11/1985 | (EP) | ............................. | E21B/21/06 |
| 9429570 | 12/1994 | (WO) | ............................. | E21B/37/08 |

OTHER PUBLICATIONS

The Lubrizol Corporation, "Lubrizol OS 84772".
The Lubrizol Corporation, "AMPS Products, Data".
Brochure—The Lubrizol Corporation, "AMPS Products, Applications, Divalent Cation Stability of Copolymers Prepared with AMPS Monomer".
Brochure—Lubrizol, "AMPS Monomer, 2–Acrylamido–2–methylpropanesulfonic Acid", 1988, p. 5.
Brochure—Toagosei Chemical Industry Co., Ltd., "ATBS, Acrylamido Tertiary Butyl Sulfonic Acid".
Brochure—Lubrizol, "AMPS Monomer, Performance Chemistry—Pure and Simple", 1994, pp. 3–11.

* cited by examiner

*Primary Examiner*—Chester T. Barry
(74) *Attorney, Agent, or Firm*—Bracewell & Patterson, LLP

(57) ABSTRACT

A process wherein an aqueous solution of amidoalkane sulfonic acid monomer, described hereafter, the homopolymer of such monomer, the co-polymer or the salt of said monomer or homopolymer, or polyacrylamide polymer, is admixed with the fluids or solids to be cleaned. Thus, solids and fatty acids are flocculated in the completion and workover fluids, hydrocarbon fluids, halogenated hydrocarbon fluids, amines, solvents, glycols, potassium carbonate and other gas processing fluids. The oil free particulate solids as well as the produced waters are thereby rendered environmentally acceptable for discharge to the environment. Hydrocarbon fluids are rendered suitable for storage while the other fluids such as completion and workover fluids are rendered suitable for reuse.

11 Claims, No Drawings

PROCESS FOR CLEANING FLUIDS AND PARTICULATE SOLIDS

This application claims priority to a previously-filed provisional application Ser. No. 60/038,175, filed Feb. 13, 1997.

BACKGROUND OF THE INVENTION

1. Field of the Invention

This invention relates to a process for the flocculation of particulate solids, especially oil- contaminated particulate solids from completion and workover fluids or hydrocarbon fluids, the separation and removal of oil therefrom, and the prolonging of the useful life of the filter used with these fluids. This invention also has utility in flocculating finely divided solids and fatty acids from "Rule 66" solvents, halogenated hydrocarbon fluids, amine fluids and other gas processing fluids such as potassium carbonate and glycols.

2. Description of the Problems and the Prior Art

Contaminants in brines, such as completion and workover fluids, hydrocarbons and halogenated hydrocarbons disrupt the intended use of these fluids. The presence of small amounts of solids in the completion and workover fluids can directly affect completion effectiveness, and especially well productivity. Amounts as low as 500 ppm of solids in completion and workover fluids can be enough to cause total plugging in perforation tunnels, in channels behind pipe, in gravel packs and in propped fractures. Reduction in production due to plugging can be substantial and can also lead to multiple squeeze attempts required to successfully seal cement channels. In gravel packing and in fracturing, solids from the completion and workover fluid mix with the high-permeability gravel with a resulting mixture of gravel and fine solids which can be even less permeable than the fine solids alone. The smaller particles tend to fill the void spaces between the larger particles so that the permeability of the mixture is almost always less than the permeability of the smaller particulate matter. Thus, very few finely-divided solids are tolerated before the high permeability of the pack gravel is lost. There is a need to remove the finely-divided solids from the completion and workover fluids to eliminate these problems.

There is also a need to remove finely-divided solids from hydrocarbon such as naphtha and olefins as well as halogenated hydrocarbon fluids such as perchloroethylene (PERC). These fluids may contain finely divided solids or fatty acids. Hydrocarbons such as naphtha and olefins produced for the manufacture of polyolefins contain particulate impurities which must be removed before further processing. Processed hydrocarbons such as olefins collect metal and ceramic fines from catalyst or other sources. Halogenated hydrocarbon such as PERC, frequently used in dry cleaning operations, may contain fibers, sub-micron level particulate matter, oils and fatty acids. Although no individual particles may be visible to the naked eye, the presence of a color, such as a brown color in an olefin product, indicates the presence of extremely finely-divided solids. Restoring the olefin product to its clear color requires removal of the fines. Likewise, restoring a halogenated hydrocarbon to useful service requires the removal of particulate matter and fatty acids. There is a need to clean hydrocarbons such as olefins to create saleable product, purified feedstock or storage-ready fluids or to remove fine particles to permit flaring or incineration. There is a need to reduce contamination in halogenated hydrocarbons since contaminants cause the compounds to be discarded thus directly affecting operating costs and creating additional disposal problems as halogenated hydrocarbons are regulated.

It is, accordingly, the primary objective of this invention to fulfill these needs.

In U.S. Pat. No. 3,737,037 which issued on Jun. 5, 1973 to Lee Bone, III, there is described a process for treating drilling mud to remove substantially all of the suspended solids particles to provide a reusable mud. The method disclosed includes the addition of a flocculating agent to flocculate solids of size smaller than 20 microns. The flocculating agents disclosed include polyacrylates, polyacrylamides, polyamines, polyamides, partially hydrolyzed polyacrylamides, methylcellulose, carboxymethylcellulose, alkali metal carboxymethylcellulose, halides of aluminum, iron, nickel, and cobalt, aluminum sulfate, alkali metal aluminate, alum, bentonite, attapulgite, sepiolite, hydrous mica, and kaolin. There is no mention whatever, inter alia, within the metes and bounds of the Bone patent of treating clear brine, such as, completion and workover fluids.

Currently, removal of finely divided solids from hydrocarbon fluids and halogenated hydrocarbon fluids is attempted through the use of conventional filter techniques, if it is attempted at all. Frequently, the source of the problem is not recognized and when it is, the fluid is frequently disposed of as being unfit for further service. This is particularly true with fatty acid contamination.

A second objective of the current invention is to prolong the life of the conventional filter used to filter solid particles from drilling fluids, completion and workover fluids, hydrocarbon fluids, halogenated hydrocarbon fluids and amine streams as well as from other fluids. The speed of filtration and the length of time for a clean filter to accumulate a cake which disrupts flow are limiting factors in the recirculation of drilling fluids and completion and workover fluids. Traditionally, filter mesh size equals the size of the smallest particle to be screened. It is known that, and recent studies have shown that the accumulation of solids or "dirt" in a screen filter form a cake which provides a finer mesh than the original screen itself. Particles smaller than the original screen aperture can thus be retained improving the efficiency of the filter. The cake will continue to build on the filter until it reaches a point of maximum efficiency and then will begin to break down. This is due to the pressure differential created across the screen. The addition of filter aids like diatomaceous earth, while not necessary, can increase the incompressibility of the cake allowing longer filter use before the cake begins to break down. As a result, filters can attain a capturing ratio of 1:10 under certain conditions. (i.e. a 50 micron screen can provide removal of particles down to 5 microns). This allows the use of a less expensive larger mesh filter. The limiting factor associated with filter use continues to be the speed of filtration, the length of time before the cake begins to break down, and the presence of oil in the filter cake causing a disposal problem. This is true for hydrocarbon fluid and halogenated hydrocarbon fluid filtration as well as completion and workover fluid filtration. It is an objective of this invention to prolong the life of the conventional filter and address these limiting factors.

A further object of this invention is to separate oil from finely divided solids in the completion and workover fluids and to separate oil from those larger solids which will be or already have been separated from the drilling fluid or completion and workover fluid through conventional means such as shakers, which are vibrating screens canted at an angle from the horizontal, and centrifuges. These oil-contaminated solid particles are produced as a part of the drilling process and create an environmentally-sensitive disposal problem.

In rotary drilling, as practiced in oil and gas exploration, a well bore is formed which extends downwardly from the earth's surface to an oil or gas producing stratum. Formation of the well bore requires cutting into the earth with a rotating bit attached to the end of a drill string formed from joints of pipe sequentially attached as the well bore is extended downwardly. Various fluids are employed in a well bore formations, as for drilling, completions and workover operations. Exemplary of these are (1) drilling fluids, or "muds", which are clay-based, and (2) brines which are clay-free, clear, heavy (dense) fluids. Drilling fluids, or muds, are generally circulated during the drilling process and clear fluids or brines are most often used for well completions and workovers. By definition, a workover is any operation in the well bore other than primary drilling. By this definition, completion operations comprise the first "workover".

In drilling the well bore, generally a clay-based or synthetic drilling fluid, or mud, constituted of a mixture of weighting materials, clays, chemicals and water or oil, is pumped downwardly through the drill string as the well is drilled to exit through jets in the drill bit at the bottom of the hole, the mud ascending to the surface via an annular space between the exterior wall of the drill string and the wall of the hole, or well bore, which may be walled with well casing. At the surface, the mud is pumped to a shale shaker equipped with one or more layers of vibrating screens of one to three, or more mesh sizes for drill cuttings removal. The mud, after removal of the drill cuttings, is then returned to a mud pit where it is temporarily stored for reuse. The drilling fluid, or mud, or brine if it is used in drilling operations, serves several essential functions, the most important of which is to (1) control subsurface pressures and maintain stability, (2) cool and lubricate the drilling tool or bit, (3) suspend and transport to the surface all movable solids, notably drill cuttings, (4) provide rheologically-stable flow or circulation for the purposes characterized in (2) and (3), supra, and (5) to provide a chemically stable or compatible chemical environment within the well bore. The chemically stable environment will minimize or eliminate corrosion of the drill string and casing as well as provide a compatible environment to the formations encountered in order to seal off permeable formations of oil, gas or water as the well is drilled through different subterranean formations and strata. In the event of a shutdown in the drilling operation, the purpose of the mud, or brine if used in drilling operations, is to hold the cuttings, sand and other solids particulates, or residual solids materials in suspension within the column of drilling fluid while efforts are being made to maintain or restore circulation of the drilling fluid. These oil-contaminated solids, once removed from the drilling fluid or the completion and workover fluids, must be made environmentally safe before disposal.

In drilling operations, the drill cuttings when brought to the surface and separated from the mud, are contaminated with oil. Residual mud solids recovered from the mud pit may likewise be highly oil-contaminated. In fact, at one time it was highly desirable to use oil based muds comprising various solids mixed with diesel oil, e.g. typically 1 to 15 percent by volume diesel fuel, for torque reduction or viscous drag reduction on the drill string to suppress or prevent sticking of the drill string. This very useful practice, once common, is not now often used because of the oil contamination and oil-slick problem. Oil contamination of these solids, particularly the drill cuttings, presents a pressing disposal problem since the solids, when contaminated, cannot simply be dumped. This means, of course, that diesel oil is rarely ever added to muds solely for lubrication purposes, despite the advantages. Instead, more expensive mineral oils are used in oil-based muds on a permit basis. There is a pressing need for processes suitable for decontamination of the oil- contaminated solids so that they may be discarded or discharged without causing pollution of the environment. Also, there is a need to decontaminate the completion and workover fluid as well as the drilling fluid and a need to clean up the produced waters used in drilling a well.

It is, accordingly, a further objective of this invention to fulfill these needs.

In U.S. Pat. No. 4,599,117 which issued Jul. 8, 1986 to the current applicant, S. Roy Luxemburg, there is described a process for decontaminating the oil-covered particulate solids by admixing the same with an aqueous polymeric solution, specifically water-soluble polyacrylamides, and a filter aid, preferably diatomaceous earth. The oil and solid particles are separated, the oil being removed with the aqueous polymeric solution. The oil is then recovered from the aqueous solution and the decontaminated solid particles are available for disposal. The use of polyacrylamides is restricted to temperature ranges at the surface of up to only 150° F. or to short-term use before the polyacrylamide begins to break down.

In U.S. Pat. No. 4,451,377 which issued on May 29, 1984 to S. Roy Luxemburg, there is described a process for cleaning oil-contaminated well bore fluids, including brines and muds. After service, the drilling fluids or muds are often highly contaminated with oil as well as residual solids. Brines eventually become sufficiently contaminated with solids and oil that they are unfit for further use. Oil must also be separated from water from the well and such produced waters decontaminated prior to its disposal. The oil-contaminated brine, after removal from the well bore, is admixed with an aqueous polymeric solution, specifically water-soluble polyacrylamides and the admixture filtered.

A further objective of the current invention is to reduce the surface area of solids in the well bore to aid in carrying solids up from the producing zones by the drilling fluids or the completion and workover fluids. Finely divided cuttings remain in the production zone due to their size and surface area. This causes problems as described above when completion and workover fluids gather finely divided solids. The drag coefficient of the particles must be increased to allow these solids to be carried up and out of the well. Again, the polyacrylamide solution is restricted to lower temperatures and short-term use before the compound begins to degrade.

A further objective is to clean the macro-objects in the well. Build-up of solid particles adhering to the casing, drill pipe, production tubing and other equipment reduces efficiency. The well must be washed to remove particulate matter from casings and other macro objects.

A further objective is to clean contaminated or "spent" amines by flocculating finely divided solids and fatty acids from amine fluids and other gas processing fluids such as potassium carbonate and triethylene glycol, often admixed with diethylene glycol. In particular, it relates to a process for the reconditioning and recovery of contaminated or "spent" amine streams, as used by the gas treating industry in the removal of acid gases from manufactured gases and gaseous process streams, as well as glycol streams to remove excess moisture, and potassium carbonate to remove carbon dioxide.

Amines have been used for the removal of acid gases from manufactured gases and gaseous process streams for many years. For example, the gas stream from which the acid gas is to be removed is pressurized in a contacting tower, or contactor, to physically dissolve under pressure the acid gases, e.g. $H_2S$, $CO_2$, $SO_2$, RSH and COS. The gaseous stream is then counter-currently contacted with the amine to scrub out the acid gases. Typically, alkanolamines have been used for this purpose, including, among others, diethanolamine (DEA), ethanolamine (monoethanol amine, or 2-aminoethanol) (MEA), n-methyl diethanolamine (MDEA), diisopropanolamine (DIPA), and diglycolamine (DGA) as well as mixtures of amines. Typically, the contaminated amine stream is thermally regenerated by pressure reduction in one or more stages. Inert stripping vapors are sometimes supplied to the regenerator to increase the efficiency of the regeneration.

In conducting an operation of this type, typically a rich liquid amine stream from the bottom of the contactor is heated in a rich-lean amine exchanger and then flashed at reduced pressure to remove part of the acid gas. The partially stripped solution is then passed to a stripper tower and denuded of acid gas by steam stripping. The acid gases are concentrated in an overhead accumulator and then disposed of by burning in an incineration device, e.g. a flare. Lean amine solution from the bottom of a reboiler is exchanged with rich amine in solution exchangers, and then pumped back to the contactor to complete the process loop.

The constant use of a clean amine solution is absolutely essential to the success of a gas treating operation. However, in spite of the use of side stream filters and re-boilers, invariably a point is reached when the amine becomes too dirty, too contaminated, and generally too corrosive for further use in the process. The amine solution at this point has the appearance of a very dirty, viscous black liquid and has been found to contain, inter alia, iron sulfide due to the reaction of $H_2S$ with the iron of the gathering system, iron hydroxide formed at the higher pH produced by the amine stream when FeS contacts water, saturated fatty acids, generally normal, straight- chain fatty acids containing carboxyl groups capable of reacting to form soaps, and oils used as lubricants in the process, viz. compressor lubricant. It has been reported that some success has been achieved in thermally reclaiming certain contaminated amines via batch distillation in side stream, or slip stream reclaiming operations. However, the high boiling point amines, generally the most useful of the amines, cannot be reclaimed; notably diethanolamine and amines higher boiling than diethanolamine. With these amines, recovery is offset by thermal degradation of the amine as the distillation temperature is increased.

The presence of contaminants in the amines stream reduces the sorptive capability of the amine stream making it less effective as it is returned to contact the sour gas. This leads to replacement of the amine which directly affects operating costs. Amines contaminated with FeS and $H_2S$ are considered hazardous waste due to their corrosive and poisonous nature. This causes a disposal and transportation problem. Amines solution contaminated with fatty acids form an amine "soap" upon contact with the sour gas stream. This results in much lowered surface tension, allowing amine solution to easily migrate to the succeeding stages and producing disruptive foaming and bubbling. Finally, the carbon-block filters in line with the coalescers plug easily with FeS. Filtering the contaminated amine through a diatomaceous earth filter followed by a 0.5 micron, beta-rated cartridge filtration system showed little difference in the relative color of the fluid which indicates contamination. No difference in the surface tension was detected as measured with a DuNuoy Tensiometer. Current filtration technology does not remove the finely divided grounds and fatty acids from amines. There is a need to remove contaminants from amine streams so these amines can be reused, thus reducing operating costs. There is also a need to remove contaminants from amine streams to increase effectivity of the amines in service and to avoid a hazardous disposal problem. There is a need to remove particulate matter in amines to avoid plugging of the filters.

It is an objective and feature of this invention to address all of these needs and to provide a process for cleaning an amine, or amine solution which has been used in an acid gas treating operation to the extent that it has become too dirty, too contaminated, and often too corrosive, for continued effective use in an acid gas treating operation by flocculating finely divided solids and fatty acids from amine fluids. It is a further feature of this invention to allow the regeneration of the amine stream to take place on-site thus avoiding transportation problems. It is a further feature of this invention to reclaim the contaminants for resale as the contaminants are themselves valuable commodities.

A further objective of this invention is to clean glycol solutions of finely divided solids and fatty acids. Ethylene glycol (EG), diethylene glycol (DEG), triethylene glycol (TEG) and proprietary glycol mixtures are used as drying agents in gas processing plants and refineries. Typically, reservoir volumes equal to those of amine sweeteners are required for production purposes. Glycols suffer from the same difficulties as amine streams in that they become contaminated with fine particulate matter and fatty acids. When the fatty acids contact the amine stream, "heat stable amine salts" or soaps are formed. This reduces the surface tension of the solution producing the deleterious effect of foaming and bubbling as well as allowing migration of amines into and through succeeding stages. The presence of fatty acids or "soap" in the glycol solution reduce the ability to dehydrate the gas stream thus causing glycol to eventually be discarded. Due to the nature of the contaminants, these contaminated glycols are considered hazardous which further increases the difficulties associated with transportation and disposal. Also, the presence of particulate matter and soaps in the glycols causes the cartridge filters normally used to suffer from plugging and coalescers to fail.

There is a need to remove the fatty acids and particulate contaminants from the glycols to prolong the use of the glycol stream. There is also a need to clean glycols of hazardous materials to minimize the difficulty associated with transportation and disposal. There is a need to prolong the life of the cartridge filters.

It is an objective of this invention to meet these needs concerning the cleaning of a glycol stream.

A further objective is to clean safety solvents, such as "Rule 66" solvents. Rule 66 solvents are those which meet the California regulation "Rule 66" relating to their safe transportation. This regulation relates to the flash point temperatures of volatile organic solvents, "safety solvents" having a relatively higher flash point as measured by both "closed cup" and "open cup" testing. Volatile Organic Components (VOC's) are regulated both because of their potential contribution to air pollution but also based on their safety in transportation. Examples of such Rule 66 Solvents include PURESOLV®, a registered trademark of the PURESOLV Co., SAFETY KLEEN®, a registered trademark of the Safety Kleen Corp., naphtha and varsol. Contaminants in used Rule 66 solvents generally include fine particles of clay and siliceous materials as well as hydrocarbons (oils) as diluents and fatty acids. These contaminants reduce the useful life of the compound causing it to be discarded. This directly affects operating costs and creates an additional disposal problem since disposal of such fluids is regulated. Currently, filtration is used to remove particles. As with other fluids containing finely divided particles, filtration suffers from plugging of the filter media. The filter also limits the smallest size of the particle which can be screened out of the liquid. There is a need to remove finely divided particles from solvents and to extend the useful life of filters used in this service.

It is an object and feature of this invention to flocculate the finely divided solids in solvents to create flocs which can easily be removed using conventional techniques such as filtration.

In summary, it is the object of this invention to provide a process to flocculate finely divided solids suspended in completion and workover fluids as well as in hydrocarbon fluids, including halogenated hydrocarbons. Fatty acids are also removed in this process. It is also an objective to substantially prolong the life of filter cartridges used to filter completion and workover fluids as well as other fluids. Further objectives are to provide a process for separating oil from finely-divided solids in the completion and workover fluid and from larger solid particles, and to provide a process for cleaning the oil-contaminated completion and workover fluids and produced waters. Additional objectives include forcing finely divided solids from the production zone to the surface and washing the solids from macro objects in the well bore. Objectives also include the cleaning of amines, potassium carbonate, glycol solutions and solvents of particulate matter, fatty acids or oils.

BRIEF SUMMARY OF THE INVENTION

The present invention includes a process for flocculating finely divided solids and fatty acids from contaminated fluids, such as, completion and workover fluids, Rule 66 Solvents, hydrocarbons, halogenated hydrocarbons, amine fluids and other gas processing fluids. For completion and work-over fluids, at least one flocculent is added in sufficient quantity to produce flocs of the finely divided solids which can then be separated from the fluid using conventional filtration and separation techniques. The completion and workover fluid mixed with the flocculent is circulated within the well bore to flocculate finely divided solids present down hole aiding in their removal from the well. Previously-contaminated completion and workover fluids are mixed with the flocculent and filtered to recondition the completion and workover fluid for reuse. The present invention includes adding at least one flocculent to a contaminated hydrocarbon fluid, including a contaminated halogenated hydrocarbon fluid, to clean this fluid. The contaminated hydrocarbon or halogenated hydrocarbon is washed with a salt solution to make the contaminants more amenable to the flocculent. A sufficient amount of at least one flocculent is added to produce flocs of the finely divided solids and fatty acids so that these flocs can be removed by conventional filtration techniques. The present invention also includes adding at least one flocculent to a contaminated amine fluid to purify and clarify the amine fluid. A halide salt is also added prior to the flocculent to the amine fluid. The completion and workover fluid can also be treated with a hot oxygen stream. The present invention also includes adding at least one flocculent to a contaminated Rule 66 solvent after adding a salt of either chloride or bromide. This invention also includes removing contaminants from a glycol fluid by adding a solution of polymer followed by a calcium chloride or bromide salt solution to precipitate fatty acids. Additionally, the pH is elevated to at least pH=11 by the addition of NaOH solution (45%) at $\frac{1}{100}$ mL to 50 mL, or approximately 90–125 PPM. Tannic acid, in addition to at least one flocculent, is added. Tannic acid hardens the soap mass and allows the flocs to be removed using conventional separation techniques. Glycols, like the amines and potassium carbonate, are gas processing fluids. The present invention includes the addition of a flocculent to separate oil from solids and for cleaning of produced waters used in drilling a well. This invention also includes prolonging the life of a filter used to filter solid impurities from fluids by the addition of at least one flocculent. Also, this invention includes cleaning the macro-objects in a well through the addition of at least one flocculent. This invention includes a waste minimization feature. When flocs form in brines, amines or other fluids, they continue to tighten, expressing liquid therefrom. Even after pouring off liquid and waiting some seconds or minutes, it is observed that even more liquid is expressed. Pouring this liquid off, decanting, reveals yet more liquid expressed though in ever-diminishing quantity each time. At least three decantations are usually possible and necessary. Since maximum liquid expression from the floc does not occur in lab testing, it is sufficient to minimize waste volumes by more than 50%.

DETAILED DESCRIPTION OF THE INVENTION

These objects and others are achieved in accordance with this invention, a process wherein an aqueous solution of amidoalkane sulfonic acid monomer (also referred to as polymeric amidoalkane sulfonic acid), described hereafter, the homopolymer of such monomer, the co-polymer or the salt of said monomer or homopolymer, or polyacrylamide polymer, is admixed with the fluids or solids to be cleaned. Thus, solids and fatty acids are flocculated in the completion and workover fluids, hydrocarbon fluids, halogenated hydrocarbon fluids, amines, solvents, glycols, potassium carbonate and other gas processing fluids. The oil free particulate solids as well as the produced waters are thereby rendered environmentally acceptable for discharge to the environment. Hydrocarbon fluids are rendered suitable for storage while the other fluids such as completion and workover fluids are rendered suitable for reuse.

The goal of flocculating very finely divided solids from submicron range to about 200 microns, from any completion and workover fluid so the fluid can be recovered for reuse, is accomplished by admixing amidoalkane sulfonic acid to circulating completion and workover fluid. The flocculates thus formed can be filtered out by conventional means. In a preferred embodiment of this invention, an aqueous solution of the salt of the homopolymer of the amidoalkane sulfonic acid, n-2-acrylamido 2-methyl-1-propane sulfonic acid (hereinafter "AMPS®", which is a registered trademark of Lubrizol), is admixed with the completion and workover fluid which is a brine in the concentration range of 5–500 ppm AMPS®. The brines are saturated typically at about 300,000 PPM or more, by diluting/mixing salt solutions which start out at 500,000 PPM. They become diluted after use and are often used as multiple-salt completion brines, valued according to their density. Diatomaceous earth is added as a filter aid for filtering the completion and workover fluid after flocculation is achieved. AMPS® flocculates fines as small as 0.1 micron and creates flocks as large as ¼". With the use of the flocculent AMPS®, no gravimetrically measurable solids remain in solution after filtration. Thus, the use of AMPS® to flocculate finely divided solids in completion and workover fluid creates remarkably large flocculates from submicron sized particles while allowing long-term stability and operating temperatures near to the boiling point of the completion and workover fluid.

Another preferred embodiment for cleaning workover and completion fluids includes adding hot oxygen at about 250 deg F in the amount of 1.15 cubic foot per 1000 ppm Fe(OH)2 per barrel of completion and workover fluid to convert Iron II to Iron III, and adding the polymer AMPS® for flocculating. Alternately, oxygen can be added in the form of carbamide peroxide or other oxygen rich compound.

The amidoalkane sulfonic acid polymer is dissolved in water, or aqueous solution, in concentration sufficient that, in addition to flocculating all finely-divided solids, when the solids are admixed with the solution, oil will be removed from the particulate solids, and the oil demulsified. In a preferred embodiment, the polymer is generally predissolved, for convenience, in water in concentrations of 1500–10,000 parts polymer per million parts by weight of water (ppm). This solution is then added to the aqueous brine solution which contains the particulate solids. Suitably, the aqueous amidoalkane sulfonic acid solution with which the oil-contaminated particulate solids are contacted, immersed or otherwise treated will contain about 20–50 parts of polymer, per million parts by weight of the aqueous brine solution, (PPM). The amidoalkane sulfonic acid solution and particulate solids on being added one to the other will be thoroughly admixed. Preferably, a filter aid, suitably a diatomaceous earth, is also added to the solution. Suitably from about 0.1 percent to about 2 percent, preferably from about 1 percent to about 2 percent, of the filter aid is incorporated with the amidoalkane sulfonic acid solution, based on the total weight of the solution and filter aid.

The diatomaceous earths are a preferred type of filter aids which are useful in the practice of this invention. Diatomite, or kieselguhr, a hydrous form of silica or opal composed of the siliceous shells of diatoms, which are unicelled aquatic plants of microscopic size, is used as a filtering aid, and is particularly useful in the practice of this invention. Other useful materials are, e.g., bone char, Vermiculite, charcoal, Fuller's earth, acid-treated clays, bauxite, activated alumina, silica gel, asbestos, sawdust, and the like. Decolorizing carbons and earths, such as commercially known Darco, Carbrox, Suchar, Norit, Filtrol, Palex, and activated clays which are oil absorbent materials are rendered non-adsorbent and are therefore particularly useful in the practice of this invention.

AMPS® in completion and workover fluids can withstand temperatures as high as 275° F. at standard atmospheric pressure, near the boiling point of the saturated brine. This is a significant improvement over polyacrylamides which only withstood temperatures to the point of visible ebullation, about 220° F. at standard atmospheric pressure. Furthermore, AMPS® can remain in the well without degradation from a few days to a few years. Flocculents currently used in the well bore, such as polyacrylamides begins to break down much earlier, within one or two months in some applications.

A preferred embodiment for cleaning produced waters includes the same addition of halide salt and AMPS® and also includes the addition of tannic acid solution. The water pH has priorly been elevated to the alkaline range of pH=9 to pH=13. When this embodiment was tested on a sample of produced water from Wyoming in a laboratory test, the sample which was laden with elemental sulfur, white in color and elastic in character produced large white flocs with a brown cast which were easily removed by filtering through a paper towel. The yielded water was virtually solids-free.

The goal of flocculating very finely divided solids of any composition from a hydrocarbon fluid or a halogenated hydrocarbon fluid to purify and clarify the fluid is achieved in a similar manner. The invention includes washing the hydrocarbon or halogenated hydrocarbon fluid with a salt dissolved in water of elevated pH to make the solids amenable to the amidoalkane sulfonic acid and other polymers. Amidoalkane sulfonic acid is admixed with the hydrocarbon/salt solution to form flocculates. These flocculates can be filtered out using conventional means.

A preferred embodiment of this invention as applied to cleaning hydrocarbon and halogenated hydrocarbon fluids includes adding a 1–2% solution of $CaCl_2$ or $CaBr_2$ to the hydrocarbon or halogenated hydrocarbon fluid as well as the homopolymer of the salt form of AMPS® in the concentration of 20–50 ppm. This causes immediate flocculation. The flocculates can be removed using conventional filtration techniques such as the Swan Environmental Rotary Disk Filter to remove water from hydrocarbon fluid, as well as to remove solids. For a two-phase fluid such as hydrocarbon and water-soluble brine, a VORTOIL® oil-water separator or a Swan Rotary Disk Filter can be used, solids having been filtered by other conventional means. Filtering-type rotary centrifuges may also be employed.

Another preferred embodiment of this invention as applied to cleaning hydrocarbon and halogenated hydrocarbon fluids includes adding a 1–2% solution of $caBr_2$ and 20–100 ppm polyacrylamide. This also causes immediate flocculation. There is no appreciable difference in time required to create the flocculates when using polyacrylamide or AMPS® or mixtures of solutions of both.

The use of a polymer solution and a salt solution to flocculate finely divided solids was tested on contaminated olefins at National Petrochemical Corp., Rayong Plant Laboratory, Thailand, in December of 1990. The olefins were contaminates with finely divided catalyst grinds. The addition of a salt solution and polymer solution created flocculates so large that a paper towel was effectively used as a filter to separate the solids and create a clear, saleable olefin fluid. This test was conducted using polyacrylamide and calcium chloride. A preferred embodiment would include the use of AMPS® for the polymer solution as AMPS® will produce an even larger floc in this situation. The solids are typically zeolites and catalyst metals, eg. platinum or palladium. These are recoverable and valuable for reclamation. Compared to polyacrylamide alone, approximately half the quantity of AMPS® concentration is needed to produce the same average-diameter floc as polyacrylamide. When combined together as a 50—50 (vol/vol %) solutions, and added to the contaminated olefin, the same 50—50 vol % applies. Additional polymers in combination yield smaller flocs, thus indicating an enhancement of polyacrylamide by the addition of AMPS®.

An addition goal of this invention is to permit the use of less expensive, larger pore size filter cartridges, particularly those used for filtering the completion and workover fluids as they are returned to the well bore. The use of an amidoalkane sulfonic acid in completion and workover fluids and the addition of a salt solution before the addition of amidoalkane sulfonic acid polymer for a hydrocarbon fluid, creates substantial benefits while employing conventional filtration techniques. In conventional filters such as those used with completion and workover fluids, a cake will build up on the filter screen to the point where maximum differential pressure occurs and break down of filter is required, meaning breaking down or opening of the filter to replace the screen. The use of amidoalkane sulfonic acid extends the life of the filter cartridges which follow the screen or "Direct" filters which precede the cartridge filters, "and results in a filter cake on both screens and cartridges which are oil-free. The life of the filter cartridges have been shown to be extended greatly, while the oil-decontaminated solids are readily disposed of at either an on-shore or off-shore drilling site.

The result of this preferred embodiment of this use of AMPS® with diatomaceous earth is that the life of the filter cartridge is extended as much as four times before disposal is necessary. The time allowed for cake buildup before blowdown is also extended and the cake and filter cartridge are left oil-free. This effect is achieved due to the nature of all amidoalkane sulfonic acid containing polymers which impart an oleophobic character to both finely-divided suspended solids and the surfaces of filter aids, such as diatomaceous earth while forming an oleophobic "film" on those solids, typically a monomolecularly-thin film with a high charge electrostatic density, such surface-active properties serving to repel oils from such surfaces. It is also an effect of AMPS® that the speed of filtration is up to 8 times faster than "normal" (without a flocculent) using amidoalkane sulfonic acid salt solution, up to twice as fast as using polyacrylamide due to much lower filter pressure differentials. A feature of this invention is that little or no oil is retained on the filter cake which can be readily disposed of after use by dumping in an environment-sound manner, since there is no oil contaminant.

Various types and virtually any type of filter can be used in the separation, and removal of oil from the admixture of the amidoalkane sulfonic acid solution, filter aid, and particulate solids, viz. gravity filter, pressure filters, or vacuum filters, this including intermittent vacuum filters and continuous vacuum filters, this being a classification of filters according to the nature of the driving force that causes filtration. Or, if described in terms of their mechanical characteristics useful filters are those which can be termed plate-and-frame filters, leaf filters, rotary drum filters, top feed filters, disc-type filters, sand bed filters and precoat filters. Precoating with water, which affects brine density and'therefore its value, is not necessary. Leaf filters have proven particularly effective in the practice of this invention, the leafs supporting the filter medium through which the pre-mixed amidoalkane sulfonic acid solution filter aid and the oil-contaminated fluids have been passed, with the aid of a vacuum, pressure, or gravity driving force, to produce separation, recovery of the oil in the liquid phase after passing through the filter, as well as the cleaning, and decontamination of the solids. The oil is also cleaned of solids often to the extent of the removal of the color bodies in the oil, demonstrating a feature and use for this process in the washing and filtration of oil emulsions. Though, most often, the amounts of oil observed are economically inconsequential, there is enough to leave a "slick" if dumped.

It is a further goal of this invention to separate oils from finely-divided solids in the completion and workover fluid being recycled or from those larger solids separated from the fluid through conventional means such as shakers and centrifuges. The treatment of oil-contaminated solids screened out of the drilling fluid includes admixing the solids with a salt solution followed by the addition of an amidoalkane sulfonic acid polymer to wash, leach out and demulsify the oil. When AMPS® is used in the circulating completion and workover fluid, oil is "blown off" the surface of solid particles of any size before reaching solids control equipment designed to remove the larger particles. Flocculation of the solids profoundly reduces the surface area and greatly increases the drag coefficient of the solids so that removal from the wellbore is easily accomplished. By circulating amidoalkane sulfonic acid with the completion and workover fluid, the larger particles separated from the completion and workover fluid using conventional solids control equipment are oil-free and thus readily disposed. Those solids separated from the drilling or completion and workover fluid without exposure to the amidoalkane sulfonic acid solution can be admixed with an amidoalkane sulfonic acid and salt solution to achieve the same removal of oil from the solids surfaces. The finely divided solids remaining in the completion and workover fluid admixed with amidoalkane sulfonic acid are flocculated as described above. The same flocculation agent "blows off" the oil from these solids due to its surface active properties. Thus, the flocculates collected on the filter cartridge are also oil free and ready for disposal. The action of the amidoalkane sulfonic acid upon the solids enables the oil to pass through filters which are known to be highly oil-absorbent. The aqueous liquid, including the oil, passes through the filter, the oil separating from the fluid and floating on the surface of the fluid after passage through the filter. It is surprising that essentially all of the oil passes through the filter mass since the materials of which most filters are constructed, i.e. wound or woven materials of polypropylene, polymers of Dacron, Terylene (or terlene), rayon and its homologs or any material, synthetic or natural, which possesses a very high surface-to -volume ratio such as wound spools of non-woven thread or interwoven screens of the aforementioned materials, are known to be highly absorptive. The amidoalkane sulfonic acids are so highly oleophobic and film forming that oil residing on the filter prior to the contact with finely divided solid particulate is removed from the filter upon contact with the completion and workover fluid containing amidoalkane sulfonic acid. Thus, the use of amidoalkane sulfonic acid cleans the filter. The oil released from the surface of the solid particulates demulsifies and can be separated from the water solution by conventional means. Thus, production waters and other fluids can be similarly treated for oil-decontamination. This constitutes a unique feature of this invention. This process is effective in all fluids, including drilling fluids and completion and workover fluids.

It is a further inventive feature of the use of amidoalkane sulfonic acid that the addition of this compound acts to reduce surface area of solids in the well bore to aid in carrying solids up from the producing zones by the drilling fluids or the completion and workover fluids. By increasing the drag coefficient on the finely divided solids, those solids which would normally accumulate in the production zone are circulated to the surface. There the solids can be filtered out with the other particulate matter. A preferred embodiment of using AMPS® homopolymer salt solution at a concentration of 5–500 ppm allows use of the polymer at an upper temperature limit of 275 at standard atmospheric pressure or up to 584° F. at corresponding well bore pressure. This allows stable circulation of the drilling fluid or completion and workover fluid with AMPS®.

It is a further inventive feature of the use of amidoalkane sulfonic acid that the circulation of this compound in the completion and workover fluids serves as a well wash for removal of particulate matter from well casing and other macro objects, i.e. pipes, pump interior surfaces, casing perforation tunnels and vertical or horizontal perforation tunnels created by any means. The amidoalkane sulfonic acid separates particulate matter from the well and flocculates these solid particles together such that they are easily filtered out of the completion and workover fluid once they reach the surface. Note that fine solids from the formation which migrate into the perforation tunnels and the well bore are also flocculated. Again, a preferred embodiment of using AMP® in solution allows circulation of the solution at temperatures as high as 584° F. at well bore pressure where other compounds, such as polyacrylamide, used as a well wash would begin to degrade. The result of circulating the amidoalkane sulfonic acid in the completion and workover fluid includes cleaning of solids adhering to surfaces of equipment and perforation tunnels and moving these solids out of the well bore where solids can be filtered out.

A further goal of this invention is to clean a contaminated amine solution with a water soluble polymer which hydrolyzes on solution with said contaminated amine solution. A halide salt of an alkaline-earth metal is added as a solution with the water soluble polymer to the contaminated amine solution thus causing flocculation. The water soluble polymer is added to the contaminated amine solution in concentration ranging up to about three quarters of one percent, or 7500 parts per million of solution, based on the total weight of the contaminated amine solution, preferably from about 5 parts to about 10,000 parts, more preferably from about 50 parts to about 1000 parts, per million parts (ppm) by weight of the contaminated amine solution. A preferred embodiment includes the water soluble polymer AMPS® as flocculent and calcium bromide for the salt. Another preferred embodiment involves the use of an anionic polymer as flocculent. Yet another preferred embodiment includes the use of polyacrylamide polymer, co-polymers of (poly) acrylic acid and acrylamide, other water-soluble copolymers of sodium (poly) acrylates and polyacrylamide. The alkaline-earth metal halide salt is generally added as an aqueous solution to the contaminated amine solution and is added to the contaminated amine solution in a concentration sufficient, with the added water soluble polymer, to produce a flocculent, the amount of said added alkaline-earth metal halide salt being less than that required to saturate the contaminated amine solution. Preferably, the amount of alkaline-earth metal halide salt added to the contaminated amine solution ranges from about 100 parts to about 15000 parts (1½%), more preferably from about 150 parts to about 500 parts per million parts (ppm) by weight of the contaminated amine solution.

A preferred embodiment of this invention includes adding a 1% $CaCl_2$ solution to the amine and AMPS®. Another preferred embodiment of this invention includes adding a 1% $CaCl_2$ solution to the amine and adding the polymer polyacrylamide.

The water soluble polymer and alkaline-earth metal halide salt flocculate the fine solids suspended in the contaminated amine solution, including iron sulfide, iron hydroxide and carboxylated compounds, such as fatty acids. While the halide salt forms a gelatinous precipitate with the contaminates, the addition of the polymer serves to harden the precipitate such that large easily-filterable flocs are created. The mechanisms of hydrolysis, aminolysis and temporary halide substitution is also believed to precipitate carboxylated compounds and hydrocarbons, if any, with subsequent or simultaneous flocculation of same including the added substituents. The carboxylated compounds in the contaminated amine solution have been found to play a positive role, along with the water soluble polymer and alkali-metal halide, in the formation of the flocculates. The flocculate carries down and separates from solution the contaminating components of the contaminated amine solution. The solids thus flocculated should be removed as early as possible through conventional techniques such as centrifugation or filtration. Although the polymer hardens the flocculates temporarily, they dissolve back into solution beginning within a few minutes of their formation. This depends on the molecular weight of the fatty acids. If larger percentages of higher fatty acids are present, the flocs will last longer. On separation of the flocculent from a treated amine solution, preferably by filtration, the surface tension is raised to the level expected of a clean amine and this eliminates the foaming problem. Also, no black color remains. The iron sulfides, which have been found the cause of the black color, are removed from the solution with the flocculate to leave behind a substantially clear, reconditioned filtrate. This filtrate can be returned to the process and reused efficiently and effectively for the removal of acid gases from manufactured gases, and gaseous process streams. The process of this is accomplished at the "in situ" temperatures of the amines as found in the gas plant and may be accomplished at ambient temperatures as well.

Polymers useful in the practice of this invention are: (1) amido sulfonic acid monomers, their salts, homopolymers and co-polymers; (2) water-soluble polyacrylamides, particularly the more highly anionic species, which are preferred. Exemplary of the polyacrylamides are the "poly flocs" or "Separans" which were/are marketed by Dow Chemical Company under the formulas Dowell (or Dowell-Schlumberger) M-144, Dowell M-172, Dowell M-173, the "Cyflocs" marketed by Cytec Corporation (formerly American Cyanamide) as formulas 4000, 4010, 4020, 4500, as well as "Cyguard" formulas containing sodium polyacrylates and the "Hercof locs" marketed by the company formerly known as Hercules Chemical Company; of which the more highly anionic compositions are preferred, e.g., Dowell-Schlumberger's M-144 or Cytec's Cyfloc 4000; (3) water soluble poly acrylic acid and it's homologues, e.g. poly methacrylic acid, and their salts, and copolymers of acrylic acid and methacrylic acid with their hydrophobic or hydrophilic comonomers; (4) water-soluble poly ethylene oxide resins, exemplary of which are those sold commercially by Union Carbide Corporation under the Polyox trademark, e.g. Polyox WSR-N-301, WSR-N-80, WSR-N-750 and the like, or as produced by Meisei Chemical Works Ltd. sold under the trademark Alkox, or by Seitetsu Kagaku Co., Ltd. under the trademark PEO; (5) polyvinyl alcohol, the only linear polyhydroxy polymer which is readily water soluble, exemplary of which is Elvanol, a trademark product previously sold by DuPont Chemical co; (6) B.F. Goodrich's Carbomer 940; (7) water-soluble carboxymethylcellulose exemplary of which is sodium carboxymethylcellulose, hydroxyethylcellulose, hydroxypropyl methylcellulose as viscosifiers and admixtures there of which are produced worldwide by numerous industrial concerns under various trademarks, viz, CMC-T by Hercules Inc., Edifas B. by Imperial Chemicals Industries, Ltd., Methocel and Ethocel formerly sold by Dow Chemical Company, etc.; (8) soluble gums known as carrogeenans which occur in certain species of red seaweeds of the Gigartinaceae, Solieriaceae, Phyllophoraceae, and Hypneaceae families. Chemically these are sulfated linear polysaccharides of D-galactose and 3,6 anydro-D-galactose and, by virtue of the half-ester sulfate groups are polyelectrolytes; (9) guar gum, a readily water-soluble carbohydrate polymer constituted as a chain of Beta-D-galactopyranosyl units linked (1->4) with single-membered Alpha-D-galactopyranosyl units being linked (1->6) with the main chain; and (10) chitin, chitosan and n-carboxymethyl chitosan, collectively referred to as "chitin".

Exemplary of the alkaline-earth metal halide salts useful in the practice of this invention are $CaCl_2$, $CaBr_2$, $CaF_2$, $BaCl_2$, or mixtures of these and other alkaline-earth metal halide salts; but particularly $CaBr_2$ which is preferred.

The carboxylated fatty acid compounds found in contaminated amine solutions react with the water soluble polymer and alkaline-earth metal halide salt to form a flocculate. The alkaline-earth metal halide ion, notably the calcium or alkaline-earth metal ion, is believed to react with the carboxylated compounds, or fatty acids, to form insoluble soaps. This can occur by hydrolysis of a carboxyl group to replace the hydrogen with the alkaline-earth metal. Or, it can occur by aminolysis of an $NH_2$ substituent substituted for the hydrogen of a carboxyl group by the alkaline-earth metal halide. An insoluble soap is formed, flocculated, and then removed from solution.

The flocculation can be conducted at generally mild conditions, suitably at temperatures ranging from about 5° C. to about 65° C., preferably from about 15° C. to about 40° C. Since processing with polymers is accomplished at lower temperatures, less re-boiling is necessary. This reduces the probability of physical re-arrangement of the amine moieties which, while chemically the same, reduce the sorptive capability of amines to handle sour components. Pressures are not critical, and generally atmospheric or near-atmospheric pressures are suitable. The polymer and alkaline-earth metal halide salt are suitably added as solutions to the contaminated amine solution, and stirred via use of a mechanical mixer to aid in forming the flocculate. The flocculate, which contains the contaminants, can be separated from the clear supernatant liquid by decantation, but preferably by filtration or centrifugation. Virtually any type of filter can be used for the filtration, viz. vacuum filters, pressure filters, centrifuges or the like.

A feature of this invention is that the removal of the contaminants from the amine solution causes de-colorization from darker to lighter and in some cases to water-white solution. A feature of this invention is that the presence of the polymer allows the filter life to be prolonged and a coarser, less expensive filter cartridge to be used. A further feature of this invention is the reduction of total reservoir volume requirement since in situ recovery will allow for reuse. Likewise, the attendant "outside" reprocessing costs will be eliminated, though outside processing including this technology yields a more effective, longer-lasting amine since little or no molecular rearrangement occurs. A further feature of this invention is that fatty acids removed from the amine stream can be further processed for their commercial value.

The process of this invention as applied to amine solutions, and its principle of operation, will be better understood by reference to the following non-limiting examples, and data.

AMINE EXAMPLE 1

A sample of heavily contaminated DEA was taken from a Gas Processing Plant at Poplarville, Miss. A 50 mL quantity of diethanolamine (DEA) was placed in a 100 mL beaker. The DEA is a 25% (wt/wt %) solution in water, containing several contaminants comprising ferrous sulfide (FeS) derived from hydrogen sulfide ($H_2S$) occurring naturally in a natural gas stream from a producing/gathering system at Poplarville, Miss. The FeS is extremely finely-divided, appearing as a dark, faintly translucent greenish-brown color in the liquid. A second sample of the same liquid filtered by means of several passes through a diatomaceous earth filter press followed by 0.5 micron filter cartridges with absolute BETA w rating of 5000 ($B_{5u}$=5000) was also observed and later analyzed. This resulted from an actual job done at the plant to try to clean-up the amine to permit better sorption of $H_2S$. The second sample showed no color change after filtration. Improvement of translucency was, subjectively, only faintly distinguishable with a 60 watt incandescent Bausch & Lomb illuminator.

Turbidimeter readings were taken of both samples with a carefully-calibrated turbidimeter, (Hach Chemical Company, Model 16800). Both samples registered full-scale turbidity in excess of 100 NTU, (Nephelometric Turbidity Units), the upper limit of this instrument. The fluid was translucent however. Later testing with a higher range instrument with 'before and after' (pre- and post-filtration) of the two samples with an RAI turbidimeter (RAI, Inc., Hauppage, N.Y.) revealed turbidity of 260 NTU and 150 NTU respectively, though there was little or no discernible difference between the samples to the eye of several observers. It should be noted that the production plant filtering equipment, including filters, coalescers and carbon bed filters (Fluidized-bed type) had preserviced the DEA. The diatomaceous-earth 0.5 micron filter equipment was used as an "add-on" service filter in addition to normal plant filters above-mentioned, for a period of about 12 hours as described above, resulting in almost no change in color or turbidity. Considerable foam was observed during the filtering operation. This is not regarded as unusual since foaming of the DEA absorber is a perennial in-plant complaint, the latter observation prompted a later examination of surface tension.

It is observed that FeS is a corrosion product of $H_2S$ activity on the iron of the gathering system and of the pipeline transmission system directed to the gas processing and compressor plant. The absorption of $H_2S$ and to a lesser extent, $CO_2$ and other contaminants i.e., water vapor, mercaptans, sulfur carbonyls, (COS) is limited by the sorptive capability of the amine. When laden with FeS the DEA, which is normally a clear, near water-white solution, is a dark, greenish-brown color. The color bodies are in the submicron range, appearing to be measurable only in the Angstrom region as a "color" in a translucent, or even a transparent fluid.

Surface tension measurements with a Du Nouy tensiometer were also made of the fluid, as it was observed that the "brown color" carried over to subsequent stages of processing, viz., quantities of brown color fouled a potassium carbonate ($K_2CO_3$) contactor and FeS was subsequently observed in the carbonate solution upon testing. The $K_2CO_3$ is separated process-wise and physically from the $H_2S$ absorption or first "sweetening" stage typically by gas-liquid coalescers which isolate the DEA contactor(s) and carbon-block filters from the $CO_2$ removal stage contactors. Clearly, it could be reasonably postulated that low surface tension was permitting migration of the DEA through the system to the carbonate $CO_2$ sorption stage. The formation of foam, comprising stable or semi-stable bubbles was also observed. It should be noted that FeS, DEA and carbonate was found in the TEG (Triethylene Glycol) solution employed as a dryer in the last or third stage of the plant positioned prior to the "sale valve", or custodial transfer system.

After cleaning and recovering the DEA using the recovery process, surface tension measurement was reported. Prior measurement averaged 20 dynes/cm. after recovery. Surface tension increase afterward was confirmed by the lack of foam or bubble tendencies even with later, vigorous agitation. Foam or "structural" bubbles could not be observed for more than 2 or 3 seconds. Longer lasting foam was not observed. Tensiometer measurement conducted upon the recovered amine solution averaged in excess of 50+ dynes/cm, varying about 2–10 dynes/cm. That number, viz., 48 to 56 dynes/cm, was observed over 10 sets of measurements. Earlier gas chromatograph tests revealed the presence of low molecular weight fatty acids. In an effort to identify the causes of low surface tension, gas chromatography was selected and subsequent gas chromatography tests revealed the presence of low-molecular weight fatty acids ranging to perhaps $C_{10}$, viz., formic acid through caprylic acids. The higher and especially the 'odd' carbon fatty acids ($C_5$, $C_7$, $C_9$, etc.) are presumed to be from small quantities of lubricants in the compressor equipment for the transmission system. Note that $C_5$, $C_7$, and $C_9$ acids, viz., Valeric, Enanthic and Pelargonic Acids, respectively, are not found in nature, hence were unexpected in Gas Chromatograph analysis. These acids, while present in trivial amounts, were nonetheless detectable.

These results confirm the thesis that the DEA was contaminated with a mixture of fatty acids, some of which are mutually-dissolved in the water of the DEA solution. Upon contact of the natural gas stream with the DEA $H_2S$ absorber column (contactor), fatty acid vapors condense in the contactor immediately forming a low surface tension fluid of the DEA solution, sometimes called heat-stable amine salts. The fatty acids form an amine soap. The soap is the underlying cause of lowered surface-tension in the DEA. This explains the migration of low-surface tension liquid from stage to stage in the DEA gas processing plant. The lowered surface tension is the cause of the migration of amines and carbonates found in the $CO_2$ removal stage and in the dryer stage TEG.

As it is known that halogen salts, e.g., NaCl (Sodium Chloride) as dilute as sea water, will "salt-out" soaps from their solutions, a number of "salting-out" agents were applied, ranging from Potassium Chloride (KCl) through Calcium Bromide ($CaBr_2$). All were successful in accomplishing the precipitation of "soap" in solutions of DEA, DIPA (Di-isopropanolamine), MDEA (Methyldiethanolamine) as n-methyl DEA, and MEA, or ethanolamine (Monoethanolamine, a primary amine).

In the case of KCl application however, salting-out was far less obvious and did not form a substantive precipitate. The amines tested in the laboratory were virginal, variously contaminated with mixtures or Formic acid, ($HCO_2H$), Acetic acid, ($CH_3CO_2H$) and Propionic Acid, ($C_3H_6O_2$). The liquid fatty acids through the $C_{10}$ acids were tested in solutions of DEA, DIPA, and MDEA. All formed partly soluble, later-precipitated soaps when other halogen salt was added.

For example, a mixture of formic, acetic and propionic acids was added to a 25% DEA solution in water. The mixture was equally divided by volume and comprised 10% of the total solution, (vol/vol%) and about 7% of the solution by weight. Addition of 0.75% (vol/vol%) of a 50% volumetric dilute solution of Calcium Bromide (the article of commerce has a nominal density of 14.2 lb./gal.-specific gravity 1.70) with "trivial" mixing by a spatula easily salted out the soaps formed by the acids in the DEA. Subsequent addition of anionic polymers having a chain-length of about 3 million, a high molecular weight and about 4% to about 30% hydrolysis, typical of polyacrylamide-poly acrylic copolymers caused immediate flocculation of the precipitate in the presence of highly diluted salts. The same was observed when AMPS® was applied in similar proportion, viz 7500 PPM solution added at ¾ of 1% by volume.

The thesis for the prior-described process of Example 1 is, clearly, to precipitate the dissolved solids, then immediately flocculate them, forming large tightly-coagulated flocs to enable mechanical removal by relatively simple means, viz., filtration, centrifugation, hydrocyclones or any device comprising a screen or utilizing the differences of specific gravity of the flocs vs. the fluid in which the flocs reside.

Note that later examples describe the observations made with actual used fluids obtained from various gas processing facilities.

The method of this example was applied with various solutions of $CaBr_2$, $CaCl_2$, NaBr, KBr, KCl, and NaCl. In addition, several very long chain polymers were applied as well. Every test produced a precipitate of the soaps in the amine solutions and polymer applied as well. Every test produced a precipitate of the soaps in the amine solutions and polymer application demonstrated immediate flocculation of the solids. Interestingly, all of the above salts formed precipitates when added to the amines, even without the added fatty acids present.

The polymers applied are: Polyoxyethylene, WSR-301 (Union Carbide); 2-acryloamido, 1-methylpropane sulfonic acid (LUBRIZOL) polymerized from the monomer; "Pusher 700" and "Pusher 1000", anionic polymers of the Dow Chemical Co. sold as "mobility polymers" for water-flooding applications. Many others commercially available were also successfully applied including non-toxic polyacrylamide e.g., Stockhausen, Inc. Industrial Chemical CM-311, CM-303 and others.

AMINE EXAMPLE 2

In the laboratory, a sulfurous contamination of 25% solution of amines was conducted by adding a 1% solution of ferrous sulfide (FeS) previously dissolved in a weak acid solution of Sodium Bisulfate. This is 10,000 ppm (wt/wt %) in the solution, or 1% solution. The entirety of ferrous sulfide and sodium bisulfate solution mixture was added to the fatty acid mixture and produced a dark, brownish-black opaque liquid. When a solution of ¹/₁₀ and 1% (0.001) by volume of CaBr solution of Sp. Gr. 1.70 was added, the soap precipitated, encapsulating or entraining the sulfide, as the solution was rendered nearly water-white with a dark-gray precipitate mass falling to the bottom of the vessel.

The polymers are: Polyoxyethylene, WSR-301 (Union Carbide); 2-acrylamido 2-methylpropane sulfonic acid (LUBRIZOL) polymerized from the monomer; "Pusher 700" & "Pusher 1000", anionic polymers by Dow Chemical Co. sold as "mobility polymers" for water flooding applications.

Proceeding further, addition of an anionic polymer solution (7500 parts per million wt/vol %) which is itself a solution of between 2000 and 12,500 ppm, (wt/vol %) of a "dry" polymer, yielded large, stable dark gray-colored flocs in a water-white clear fluid. This enabled removal of the soap and sulfide contaminates in a single-step by filtering through a household-type paper towel. The amine solution remained essentially crystal-clear and water- white. Turbidity testing with the HACH Instrument showed 6 and 8 NTU on successive tests of the amine solution. The process results of Example 2 confirm the observations in Example 1, and were repeated several times.

Immediate examination of the amine solution in a Hewlett-Packard gas chromatograph showed complete removal of the formic and acetic acids previously added to the amine. Nearly complete partial removal of the propionic acid was accomplished, removing 60% in the first testing, 72% in the second test and near 90% in the third test. Note that mixing in the first test was accomplished by stirring with a stainless-steel laboratory spatula. This could only be described as "trivial mixing". Better mixing appears to produce higher percentages of removal.

Non-ionic polymers were also tested. These produced somewhat smaller flocs but all of those tested did work.

The same technology applied to amines which are virginal and contaminated only with FeS were also tested. This was done without fatty acid addition to the solution made in the laboratory. Addition of the calcium bromide solution immediately produced a precipitate. The precipitate was dark-colored gray, as before, though clearly not a "soap". Immediate subsequent addition of the polymer produced the same results, namely, crystal clear amine solution and large, easily-filterable flocs made from a milky-muddy precipitate.

AMINE EXAMPLE 3

A quantity of $K_2CO_3$ was obtained from a processing plant at Flomaton, AL. When density testing was completed, it was ascertained that the $K_2CO_3$ was approximately a 24% solution of potassium carbonate in water. Surface-tension of the solution was measured at 22 dynes/cm. This is quite low, indicating contamination from a previous stage in the gas process or perhaps from a gas stream. (We have no way of knowing the order of $CO_2$ "sweetening" the gas in that plant). Application of the halogen salts plus a range of polymers including non-ionic polymers was tried. All tests met with the success observed in the previous testing of Examples 1 and 2.

A quantity of virginal potassium carbonate, 50 mL, was tested for precipitation and flocculation of the amine obtained from the Poplarville plant which was added in a ratio of 1:24 (5% of a 20% solution of DEA). Surface tension measurement remained at about 30 dynes/cm. After a weak solution of calcium bromide was added the precipitate formed. When the polymer was added, the precipitate flocculated and the entire solution filtered through a "coffee" filter paper, leaving grayish flocs on the paper and a clear solution of potassium carbonate in the glass vessel below. This would indicate that the contamination in the amine added to the carbonate formed the "soap" which was removed by the bromide-polymer treatments. The order of addition of the 5% amine and the calcium bromide was reversed and the same result achieved.

AMINE EXAMPLE 4

A 100 mL quantity of 30 to 35% diethanolamine was obtained from a plant at Flomaton, Ala. The solution was diluted with deionized water to yield a solution of about 20 to 22%. The DEA was dark and apparently sulfide-contaminated. Once again, calcium bromide was added in proportion about ½ to 1% (vol/vol %). The $CaBr_2$ was obtained as a commercial sample from Albemarle Corporation. It had a density of 14.2 lb./gallon (Sp. Gr. about 1.70). Immediate precipitation occurred when it was added at 0.005 volume. Nonionic polymer was added at 3/10 of 1% volume of a solution of between 7000 and 7500 parts per million (wt/vol %). The polymer is about 4% hydrolyzed but is offered as "non-ionic" though it is charged. Flocs were observed immediately. When the previously applied anionic polymer was tested, larger and sturdier flocs were immediately observed as well.

AMINE EXAMPLE 5

A 500 mL quantity of "TEG", triethylene glycol, was obtained from a platform in the Gulf of Mexico (Union Oil Company, Ve39 complex). The glycol was quite viscous and laden with liquid petroleum from the natural gas stream. As mixing was difficult, a quantity of about 100 mL potable water was added to achieve reduction in viscosity of TEG before chemical addition. There was a discernible rise in the solution temperature when the water was added to a like quantity of TEG before chemical addition. There was a discernible rise in the solution temperature when the water was added and obvious reduction in viscosity. After stirring, the black mixture was again treated with a ½ of 1% to 1% solution of sodium hydroxide, NaOH and, less than 3/10% of anionic polymer solution and 1% of a 12½% solution of tannic acid (0.007 or ¾% solution of polymer in distilled water). Once again, complete separation of thick, "chunky", apparently oily flocs from a clear, transparent amber fluid was observed. The black mass of oil fluoresced brightly under long-wave ultraviolet radiation and remained tightly flocculated over a period of several days. Separating and heating the clear remainder at about 190° F. evaporated some of the water to an amber color. This was accomplished on a heater-stirrer using slow agitation by a teflon-coated stirring bar, suggesting that reboiling can reduce the water to a more desirable level in the TEG after removal of the contaminants.

Secondary Treatment—Amine Example 5 cont.

The fluid was allowed to cool and addition of DEA, 20% quantity, $CaBr_2$ and polymer at higher proportions of ½ to 1% $CaBr_2$ and about 3/10% polymer produced no further observable results. However, when $CaBr_2$ was increased to 1%, a precipitate was seen once again. Polymer addition flocculated same and the solids descended to the bottom of the vessel. A light blue, faint fluorescence was observed at the surface of the fluid though no oil or sheen could be observed.

AMINE EXAMPLE 6

A quantity of an amine solution was obtained from Erath, La. (Texaco Gas Plant). Once again, the amine (thought to be MDEA a proprietary amine solution) was blackened by sulfur and iron. The "proprietary amine" is one of Dow Chemical USA's "Gas-Spec" products. This was tested by observation before and after addition of calcium bromide solution and anionic polymer. The calcium bromide was added at 0.008 (8/10 of 1%) and the polymer at 0.003 (3/10 of 1%) added immediately thereafter. The mixture was shaken in a 40 mL vial to give good mixing and little or no shear. Immediate separation was observed. Some oil was present as well.

The amine solution was tested for iron by the addition of a "few" (3 to 5) drops of tannic acid solution (25% wt/wt %) using the tannic acid as an indicator for ferric iron Fe (III). The solution immediately turned dark purple-black. Two drops of hydrogen peroxide (30% laboratory grade) were added. The solution became opaque black immediately, indicating the presence of ferric iron probably made from the ferrous sulfide by the hydrogen peroxide. To confirm the presence of sulfur, a paper strip impregnated with lead acetate was wetted with deionized water and immersed in the amine solution. The paper strip also blackened immediately, thus indicating the presence of sulfur. This confirms the presence of both sulfur and iron.

The goal of cleaning glycol solutions of finely divided solids and fatty acids is accomplished by the addition of a salt solution followed by the addition of a polymer solution to the glycol stream to precipitate fatty acids as soap and flocculate the solids to facilitate removal of solids. NaOH is added at about 0.1% of a 25% solution to elevate the pH level, before the alkaline-earth metal salt is added, and tannic acid is added as a solution of 1% of a 12.5% solution. Finally, a polymer is added to harden the soap mass so that is doesn't redissolve. The addition of the polymer raises the surface tension to the level expected of a clean glycol and this eliminates the foaming problem. The polymer also causes other contaminants to floc together thus removing all of the contaminants at once. This produces large flocculates which tends to de-colorize the glycol and yield a re- useable, clear glycol stream which, when heated to remove water sorbed from the gas stream, is returnable to the process. A preferred embodiment of this invention is to use CaCl2 as the alkaline-earth metal to precipitate fatty acids out of glycol solutions. Another preferred embodiment is to use CaBr2 to precipitate fatty acids out of glycol solutions.

It is a further feature of this invention that the creation of the flocculants of the contaminants in the gas stream produces a prolonged filter life and thus reduces replacement costs and down-time.

A preferred embodiment as applied to glycols includes the use of $CaBr_2$ as the salt in the salt solution. A preferred embodiment includes the use of AMPS® as the polymer used for flocculation. Another preferred embodiment includes the use of polyacrylamide as the flocculent. Another preferred embodiment includes the use of vinyl acetate as flocculent. Co-polymers can also be used.

The large flocs can be separated from the glycol stream through conventional techniques such as filtration or centrifugation. The flocs contain contaminants which, once recovered, have commercial value. The fatty acids are mainly formic acid, acetic acid and propionic acids although acids as heavy as caprylic acid have been found. These are easily separated and processed to purity if desired and immediately saleable products result therefrom.

The goal of removing finely divided solids, fatty acids and oils from Rule 66 solvents is accomplished by flocculating the solids for easy removal using conventional techniques such as filtration. This is achieved by adding a salt solution and a polymer to flocculate the contaminants. The polymer also serves to demulsify any oil in the solvent. A preferred embodiment of this invention as it applies to solvents is the addition of $CaBr_2$ for the salt solution and AMPS® for the polymer. This creates large flocs and de-colorizes the contaminated fluid from darker to lighter and in some cases to water-white fluid. Likewise, the filter life is prolonged. The fatty acids can be recovered for their commercial value. The fatty acid "wastes", once recovered, can be simply "warmed" in tankage. This layers the fatty acids for easy decantation and later purification.

In summary, the use of amidoalkane sulfonic acid monomer and polyacrylamide in fluids results in flocculation of finely divided solids, cleaning of oil from solids, enhancement of filtration, removal of finely divided solids from the production zone, separation of oil from water, and removal of solids from equipment and perforation tunnels in the well. A preferred embodiment described above includes the addition of AMPS® to the fluids and solids to be cleaned along with the addition of diatomaceous earth as a filter aid. When the fluid to be cleaned is not a brine, then the addition of a salt solution is involved in a preferred embodiment of this invention. When the fluid to be cleaned is glycol or amine, a preferred embodiment includes the addition of tannic acid.

The amidoalkane sulfonic acid polymer useful in a preferred embodiment of this invention is n-2-acrylamido 2-methyl-1-propane sulfonic acid. Exemplary of this component is AMPS® (2-Acrylamido-2-methylpropanesulfonic Acid) and its aqueous sodium salt solutions marketed as Lubrizol 2401, 2403, 2404, 2405 and 2405A, and ATBS® (Acrylamido Tertiary Butyl Sulfonic Acid) marketed by Togoasei and distributed by JMS Trading Company, Inc. Other amidoalkane sulfonic acids, their salts, homopolymers and co-polymers can be substituted. The size of the chain of the homopolymer is a driving force with the longer chains being more efficient. Copolymers such as vinyl acetate with AMPS® and non-ionic polyacrylamides are also encompassed in this invention, as well as sodium (poly) acrylate and copolymers of (poly) acrylic acid and polyacrylamide.

It is apparent that various changes, as in temperature, pressure, polymer weight, concentration or the like can be made without departing from the spirit and scope of the invention as will be apparent to those skilled in this art.

I claim:

1. A method of cleaning contaminated fluids, such contaminates selected from the group consisting of finely divided solids, ferrous sulfide, oils and fatty acids, comprising the steps of:

administering a polymeric amidoalkane sulfonic acid to the contaminated fluid to flocculate the contaminants into flocs; and separating flocs from the fluid;

wherein the contaminated fluid is selected from the group consisting of safety solvents, hydrocarbons, halogenated hydrocarbons, amine fluids, and gas treatment fluids.

2. The method of claim 1, further comprising the step of:

washing the contaminated fluid with a salt solution making the contaminants more amenable to the polymeric amidoalkane sulfonic acid.

3. The method of claim 2 further comprising the step of adding tannic acid to harden the flocs.

4. The method of claim 1 wherein the flocs are separated from the fluid by filtration.

5. The method of claim 1 wherein the polymeric amidoalkane sulfonic acid is selected from the group comprising homopolymers, copolymers and salts of n-2-acrylamido 2-methyl-1-propane sulfonic acid.

6. In a completion and workover fluid, the combination with said completion and working fluid of only one additive, said additive consisting essentially of:

tannic acid, and a polymeric amidoalkane sulfonic acid which acts to flocculate contaminants.

7. The completion and workover fluid of claim 6, wherein the polymeric amidoalkane sulfonic acid is present in an amount of from about 5 to 500 ppm per gallon of completion and workover fluid.

8. A method of cleaning a contaminated gas treating fluid comprising the steps of:

adding to the contaminated gas treating fluid a flocculant selected from the group consisting of n-2-acrylamido 2-methyl-1-propane sulfonic acid and its copolymers and salts, polyacrylaride polymer, co-polymers of acrylic acid and acrylamide, other water-soluble co-polymers of sodium poly acrylates and polyacrylamide, vinyl acetate, chitin and chitosan, said flocculant causing the contaminants to form flocs;

mixing a salt with the contaminated gas treating fluid to make contaminants more amenable to the flocculent; and mixing tannic acid with the contaminated gas treating fluid to harden the flocs.

9. A method of cleaning a workover and completion fluid contaminated with at least one contaminant, such contaminant selected from the group consisting of finely divided solids, ferrous sulfide, oils and fatty acids, comprising the steps of:

administering to the contaminated fluid to flocculate the contaminants into flocs only one additive, said additive selected from the group consisting of n-2-acrylamido 2-methyl-1-propane sulfonic acid, a combination of a polymeric amidoalkane sulfonic acid with tannic acid, a combination of a polymeric amidoalkane sulfonic acid with tannic acid and hot oxygen, and a combination of a polymeric amidoalkane sulfonic acid with hot oxygen; and separating flocs from the fluid.

10. A completion and workover fluid additive consisting essentially of a polymeric amidoalkane sulfonic acid and tannic acid in sufficient amounts to flocculate contaminants in the completion and workover fluid into flocs.

11. A flocculation composition useful in flocculating contaminants within completion and workover fluids into flocs, said flocculation composition consisting essentially of:

water;

a polymeric amidoalkane sulfonic acid; and tannic acid.

* * * * *